No. 663,533. Patented Dec. 11, 1900.
W. F. CUSHMAN.
EYEGLASSES.
(Application filed June 14, 1900.)
(No Model.)
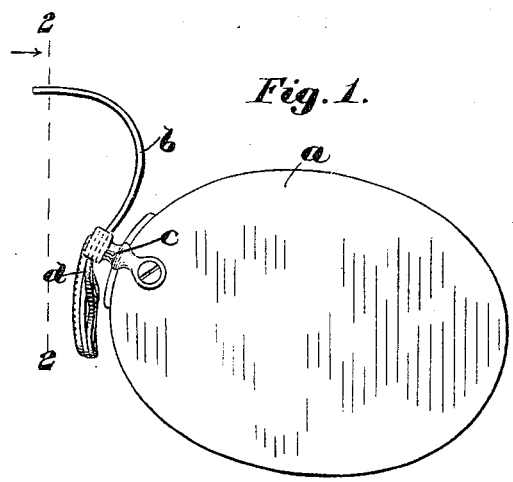
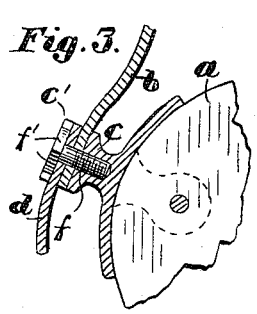
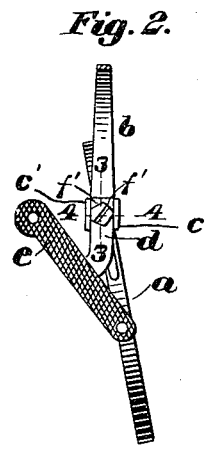
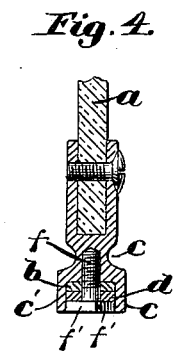
Witnesses: Inventor:
W. F. Cushman

UNITED STATES PATENT OFFICE.

WILLIAM F. CUSHMAN, OF BOSTON, MASSACHUSETTS.

EYEGLASSES.

SPECIFICATION forming part of Letters Patent No. 663,533, dated December 11, 1900.

Application filed June 14, 1900. Serial No. 20,304. (No model.)

*To all whom it may concern:*

Be it known that I, WILLIAM F. CUSHMAN, of Boston, in the county of Suffolk and State of Massachusetts, have invented certain new and useful Improvements in Eyeglasses, of which the following is a specification.

This invention relates to means employed for connecting the bridge which connects the lenses of a pair of eyeglasses with the posts which are attached to the lenses. The end portions of the bridge are connected with the posts of the lenses by means of screws. These screws occasion great inconvenience and annoyance by working loose, so that they ordinarily require frequent tightening.

My invention has for its object to provide simple and effective means for preventing the working loose of these screws; and to this end the invention consists in the improvements which I will now proceed to describe and claim.

Of the accompanying drawings, forming a part of this specification, Figure 1 represents a side view showing the portions of a pair of eyeglasses embodying my invention. Fig. 2 represents a section on line 2 2 of Fig. 1 toward the right. Fig. 3 represents a section on line 3 3 of Fig. 2. Fig. 4 represents a section on line 4 4 of Fig. 2.

The same letters of reference indicate the same parts in all of the figures.

In the drawings, $a$ represents one of the lenses, and $b$ the lens-connecting spring-bridge.

$c$ represents one of the posts, attached in any suitable way to the lens $a$ and having at its outer portion two ears or side pieces $c'\ c'$, which constitute the sides of an open-ended box. This box receives one end of the bridge $b$ and one end of the shank $d$, which holds one of the nosepieces $e$.

$f$ represents the screw which passes through the portions of the bridge $b$ and shank $d$, which are placed in the box or between the ears $c'\ c'$, the shank of the screw engaging a threaded socket in the post $c$, as usual.

In carrying out my invention I could make the head of the screw $f$ polygonal, the faces $f'$ of the head being preferably five in number, as shown in Fig. 2, although any other suitable number of faces may be employed. I also make the ears or side pieces $c'$ of the box of sufficient height to exceed the combined thickness of the bridge $b$ and shank $d$, the outer portions of said ears projecting outwardly beyond the outer face of the shank $d$, so that they bear upon the head of the screw at two opposite points, as shown in Figs. 2 and 4, after the screw is inserted. These ears or side portions $c'\ c'$ are forced together by pincers and press closely against the portions of the screw-head on which they bear. When the screw-head is adjusted, one or both of the ears $c'$ have a relatively-extended bearing on the screw-head, thus preventing the latter from working loose. The pentagonal form shown in Fig. 2 is preferred, because it enables one of the faces $f'$ to bear squarely against one of the ears $c'$, while an angle formed by two of the faces $f'$ bears at the same time against the other ear $c'$. It will be seen that this result may be produced by providing the screw-head with any odd number of faces. If the head has an even number of faces, each ear $c'$ will bear squarely against one of the faces; but in such case the delicacy of adjustment incident to a screw-head having an odd number of faces is not secured, since in that event the screw must be turned until both faces engage the ears, while with the odd number of faces the screw may be turned a distance equal to one-half the length of one face. Thus when there are five faces there are ten points of square contact.

It will be observed that the ears or side pieces $c'\ c'$ are adapted to be bent inwardly toward each other independently to slightly decrease the space between their inner sides and cause them to press firmly against the head of the screw.

I claim—

1. In eyeglasses, the combination of the post having the two independent ears or side pieces which are higher than the combined thickness of the bow and the nosepiece-shank, so that the outer portions of the said side pieces project outwardly beyond the outer surface of the shank, said side pieces being adapted to be bent inwardly toward each other, and the connecting-screw having a polygonal head extending entirely across the space between the side pieces and bearing simultaneously against the inner surfaces of the projecting portions of the same when said side pieces are bent inwardly, the faces of the polygonal head being of sufficient length to prevent rotation of the screw by their bearing against the side pieces.

2. In eyeglasses, the combination of the post having a two-sided box, the sides of which are higher than the combined thickness of the bow and the nosepiece-shank, so that the outer portions of the said sides project outwardly beyond the outer surface of the shank, and the connecting-screw having a polygonal head provided with an odd number of faces and extending entirely across the space between the box sides, one of said faces bearing squarely against one of the box sides, while the angle formed by two other faces bears at the same time against the other box side.

In testimony whereof I have affixed my signature in presence of two witnesses.

WILLIAM F. CUSHMAN.

Witnesses:
C. F. BROWN,
M. B. MAY.